United States Patent

[11] 3,557,879

| [72] | Inventors | Cornelis Van Der Lely<br>7 Brueschenrain, Zug, Switzerland;<br>Ary Van Der Lely, 10 Weverskade,<br>Maasland, Netherlands |
|---|---|---|
| [21] | Appl. No. | 857,604 |
| [22] | Filed | Sept. 12, 1969 |
| [45] | Patented | Jan. 26, 1971 |
| [32] | Priority | Oct. 20, 1965, Nov. 1, 1965 |
| [33] | | Netherlands |
| [31] | | 6513547 and 6514118<br>Continuation of application Ser. No. 810,935, Mar. 25, 1969, now abandoned, which is a continuation-in-part of application Ser. No. 546,779, May 2, 1966, now abandoned. |

[54] CULTIVATING IMPLEMENTS
7 Claims, 8 Drawing Figs.

[52] U.S. Cl. .................................................. 172/32,
172/112, 172/123
[51] Int. Cl. ......................................................... A01b 33/12
[50] Field of Search........................................... 172/32,
112, 122—3

[56] References Cited

UNITED STATES PATENTS

| 1,128,916 | 2/1915 | Thayer .......................... | 172/123X |
| 2,473,770 | 6/1949 | Seaman ......................... | 172/32 |
| 3,029,879 | 4/1962 | Wells.............................. | 172/112X |

FOREIGN PATENTS

| 252,068 | 5/1963 | Australia...................... | 172/112 |
| 696,501 | 10/1964 | Canada .......................... | 56/24 |
| 1,189,647 | 10/1959 | France .......................... | 172/112 |
| 1,014,774 | 8/1957 | Germany....................... | 172/112 |
| 1,125,700 | 3/1962 | Germany....................... | 172/123 |

*Primary Examiner*—Robert E. Bagwill
*Attorney*—Mason, Mason & Albright

ABSTRACT: An agricultural implement having a frame and a soil-working member with a drive shaft mounted on the frame. A resilient baffle for displaced soil is arranged to the rear of the implement. A change speed transmission is connected to the drive shaft which in turn is connectable to a source of power.

PATENTED JAN 26 1971 3,557,879

INVENTORS
CORNELIS VAN DER LELY
ARY VAN DER LELY
BY
Mason, Mason & Albright
Attorneys

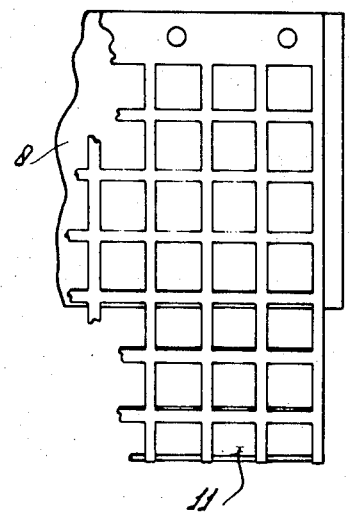
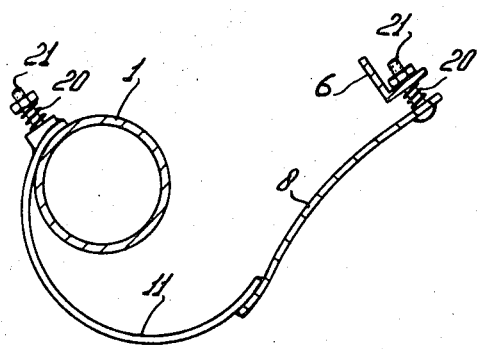
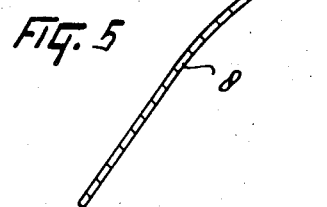
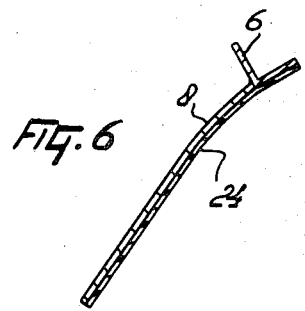

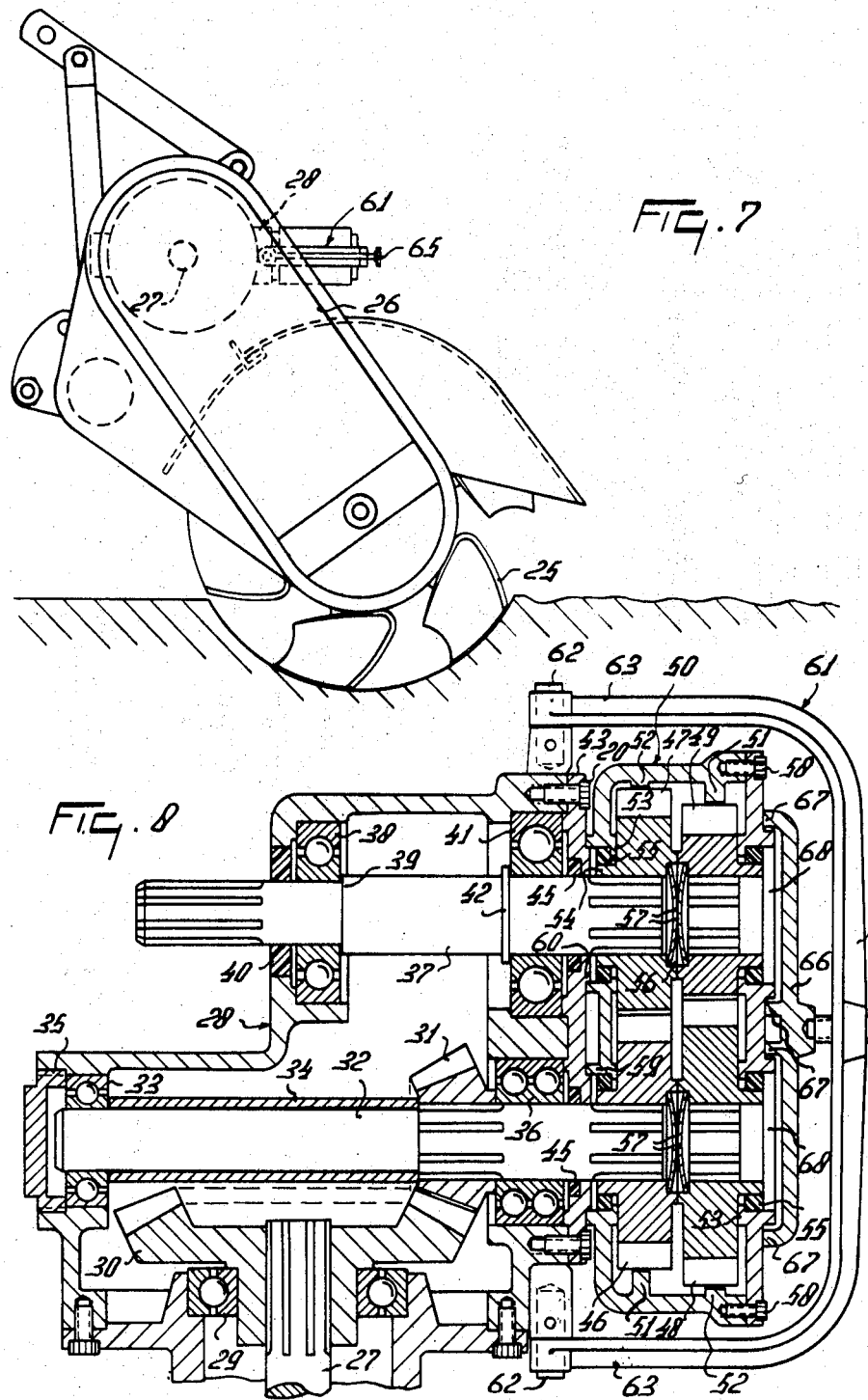

CULTIVATING IMPLEMENTS

This application is a continuation of Ser. No. 810,935, filed Mar. 25, 1969 and now abandoned, which was in turn a continuation of Ser. No. 546,779, filed May 2, 1966 and now abandoned.

This invention relates to cultivating implements.

Objects of the invention include the minimization of the tendency of soil and the like to adhere to certain parts of the implements and the provision of a simple form of adjustable transmission for driving the soil-working members thereof.

For a better understanding of the invention, and to show how the same may be carried into effect, reference will now be made, by way of example, to the accompanying drawings, in which:

FIG. 3 is a view, to an enlarged scale, as seen in the direction indicated by the arrow III of FIG. 1, but shows an alternative embodiment of certain parts which can be seen in FIGS. 1 and 2;

FIGS. 4, 5 and 6 are side elevations, to an enlarged scale, showing three alternative embodiments of certain parts that can be seen in FIGS. 1 and 2;

Figure 1:
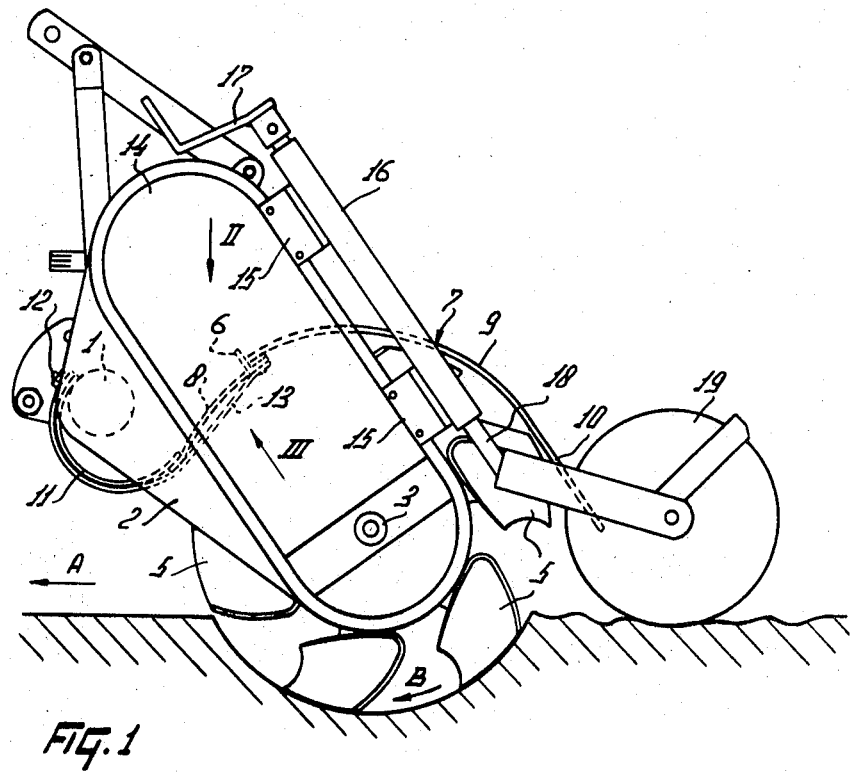
FIG. 1 is a side elevation of a cultivating implement in accordance with the invention in operation.

FIG. 7 corresponds to FIG. 1 but shows an alternative form of cultivating implement; and FIG. 8 is a sectional elevation, to an enlarged scale, showing a gear box forming part of the implement of FIG. 7.

Figure 2:
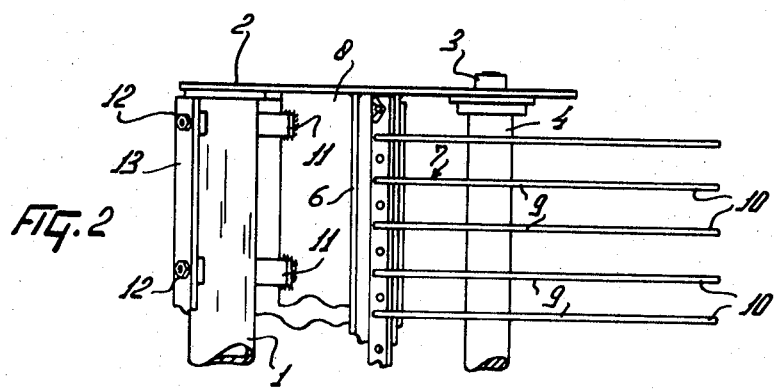
FIG. 2 is a plan view as seen in the direction indicated by the arrow II of FIG. 1.

Referring to FIGS. 1 and 2 of the drawings, the cultivating implement which is illustrated has a frame beam 1 which extends horizontally perpendicular to the intended direction of travel of the implement which is indicated by the arrow A in FIG. 1. Triangular plates 2 that are contained in vertical planes parallel to the direction A are secured to opposite ends of the frame beam 1 so as to extend generally rearwardly of the direction A from said beam 1. Lowermost regions of the two plates 2 support horizontal bearings 3 in which a shaft 4 that extends parallel to the frame beam 1 is rotatably mounted. The shaft 4 extends between the two plates 2 and carries, at regular intervals along its length, pairs of soil-working blades 5. The two blades 5 of each pair are approximately 180° removed from one another about the longitudinal axis of the shaft 4 and each pair of blades 5 is approximately 60° removed around said axis from the or each pair which is next along the shaft 4.

A bar 6 of L-shaped cross section extends parallel to the frame beam 1 and interconnects central regions of the two plates 2. A hood-shaped baffle which is generally indicated by the reference numeral 7 is fastened to the bar 6 and extends between the two plates 2 in such a way as to lie over and above and in partially surrounding relationship with the shaft 4 and the soil-working blades 5 that are carried thereby. The baffle 7 has two portions both of which extend throughout the length of the shaft 4. The first and foremost portion 8 is of solid construction and projects downwardly and forwardly from the bar 6 relative to the direction A. The second and rearmost portion 9 of the baffle is of perforated construction and takes the form of a plurality of spring steel rods 10 each of which extends rearwardly and generally downwardly away from the bar 6 relative to the direction A. The foremost and rearmost edges of the baffle 7, both of which extend parallel to the shaft 4, are located at approximately the same level above the ground. Both of these edges are located at a greater distance from a cylindrical surface containing the radially outermost points (relative to the shaft 4) of all the blades 5 than are regions of the baffle 7 located between said edges thereof. It is preferred that the baffle 7 should not be removed from said cylindrical surface at any point by a distance greater than 10 centimeters, a central region of the baffle preferably being located at a distance of 1 centimeter from said surface while the leading edge of the solid portion 8 thereof is preferably located at a distance of 8.4 centimeters from said surface. The perpendicular distance between the leading edge of the solid portion 8 of the baffle 7 and a lowermost region of said cylindrical surface (perpendicularly below the shaft 4) should be not less than 30 centimeters and is preferably about 35 centimeters.

The spring steel rods 10 from which the perforated portion 9 of the baffle is made are shaped as shown in FIG. 1 of the drawings and are of circular cross section, each of them having a cross-sectional diameter of about 9 millimeters. The leading ends of the rods 10 are fastened to the bar 6. A number of strips 11 project forwardly and upwardly from the lowermost leading edge of the solid portion 8 of the baffle 7 to which edge they are affixed by welding or the like (see FIG. 2). One edge of a sheet 13 of rubber or like elastic material is secured to the bar 6, said sheet lying between the portion 8 of the baffle 7 and the shaft 4 and extending around the lowermost sides of the strips 11 to terminate, with said strips, at the front side of the frame beam 1 to which both the sheet 13 and the ends of the strips 11 remote from the baffle 7 are secured by bolts 12.

A gear box (not shown) is fastened to the frame beam 1 and is coupled, by a shaft located in a cylindrical casing parallel to the frame beam 1, with a transmission which drives the rotary shaft 4 and which is accommodated in a casing 14 (FIG. 1). The rearmost edge, relative to the direction A, of the casing 14 has a tubular guide 16 connected to it by two spaced supporting lugs 15. A screw-threaded spindle 17, the operating handle of which can be seen in FIG. 1 of the drawings, is located in the guide 16 and is arranged to cooperate in extending and retracting manner with a screw-threaded portion of a tube 18, said portion being located within the guide 16. The lowermost projecting end of the tube 18 is fastened to the web of a forked bracket whose limbs project approximately horizontally rearwardly from said web. A horizontal axle is mounted between the free ends of the limbs of said bracket and a ground wheel 19 is rotatably carried by said axle.

In the use of the cultivating implement which has been described, its leading side is connected to the three-point lifting device of an agricultural tractor or other suitable vehicle and a rotary input shaft 14A is placed in driven connection with the power takeoff shaft of the same tractor or other vehicle with the aid of an intermediate transmission shaft having universal joints at its opposite ends. The input shaft 14A transmits drive by way of the aforementioned gear box and other transmission members to the shaft 4 which is rotated in the direction indicated by the arrow B in FIG. 1 of the drawings so that the blades 5 move forwardly over the ground relative to the direction A. As the tractor or other vehicle moves the whole implement over the ground in the direction A, the blades 5 cut into the surface of the soil in the manner illustrated in FIG. 1 to a depth which is controlled by the degree of extension of the tube 18 from the guide 16. The soil displaced by the blades 5 is carried upwardly and rearwardly beneath the baffle 7 and is thrown against the perforated portion 9 of that baffle. Stones, roots, pieces of wood and the like cannot pass between the spring steel rods 10 and are therefore carried rearwardly with the blades so that they fall to the bottom of the cavity in the soil which the blades 5 are forming at any instant. Loose soil, on the other hand, passes readily between the spring steel rods 10 and falls to the ground on top of any stones, roots, pieces of wood or the like displaced by the blades. The sheet 13 of rubber or other elastic material which subtends an angle of approximately 60° around the shaft 4 and at least parts of which extend approximately tangentially with respect to the aforementioned cylindrical surface generated by the radially outermost points of the blades 5 during rotation of the same about the shaft 4 is caused to perform a vibratory motion by the soil and tips of the blades 5 during use of the implement. The elasticity of the sheet 13 and the fact that it is constantly vibrated during use of the implement prevents soil from sticking to it. Adherence of soil at this point would tend to reduce the efficiency of the cultivating implement.

FIG. 3 illustrates a modification in which the unbroken sheet 13 of rubber or other elastic material is perforated after the manner of a square-mesh net. Once again, it is preferred that the perforated sheet 13 should be formed from rubber.

FIG. 4 illustrates a modification in which the solid portion 8 of the baffle 7 and its connecting strips 11 are connected to the bar 6 and to the frame beam 1 through the intermediary of compression springs 20. As can be seen in FIG. 4 of the drawings, long bolts 21 are entered through the bar 6 and the compression springs 20 surround the shanks of the bolts 21 between said bar and one side of the solid portion 8 of the baffle 7. Similarly, long studs 21 project from the beam 1 and the compression springs 20 surround the shanks of said studs between nuts fitted thereto and bosses carried at the ends of the strips 11. In the use of an implement having the modification of FIG. 4, the springs 20 allow the portion 8 to vibrate when it is struck by displaced soil so that any other soil which may be adhering to said portion tends to be shaken off.

In the modification of FIG. 5, the connecting strips 11 are entirely dispensed with. Only the upper and rearmost edge of the solid portion 8 of the baffle 7 is connected to the bar 6 through the intermediary of long bolts 22 and compression springs 23 of similar construction and arrangement to the bolts 21 and springs 20 that have been described in connection with FIG. 4.

FIG. 6 shows a modification in which the side of the solid portion 8 of the baffle 7 and the side of the bar 6 that face the blades 5 are both provided with a coating 24 of an organic material which is preferably a synthetic resin or other synthetic material. It has been found that a coating of this kind considerably reduces the risk of soil sticking to the portion 8.

The cultivating implement which is shown diagrammatically in FIG. 7 of the drawings has a soil-working rotor 25 which is driven from a shaft 27 by way of a transmission located within a casing 26. The shaft 27 extends transverse to the intended direction of operative travel of the implement and parallel to the central shaft of the rotor 25 (equivalent to the shaft 4 of the implement of FIGS. 1 and 2), the end of the shaft 27 which is remote from the casing 26 being journaled in a gear box 28 (FIGS. 7 and 8) with the aid of a ball bearing 29 (FIG. 8). The gear box 28 is fastened to the frame of the implement and the end of the shaft 27 which has just been mentioned carries a bevel pinion 30 the teeth of which are in mesh with those of a smaller bevel pinion 31 mounted on a splined portion of a shaft 32 that extends perpendicular to the shaft 27. One end of the shaft 32 is rotatably mounted in a wall of the gear box 28 with the aid of a ball bearing 33. A sleeve 34 surrounds the shaft 32 between the side of the ball bearing 33 that is closest to the shaft 27 and the side of the pinion 31 that is also closest to the shaft 27. The opposite side of the ball bearing 33 bears against a plug 35 which is threadedly received in the mouth of the aperture in the wall of the gear box 28 through which the bearing 33 is entered. The shaft 32 is also mounted in a double ball bearing 36 which bears against the side of the bevel pinion 31 remote from the sleeve 34 and which is housed in another wall of the gear box 28.

A further shaft 37 is rotatably mounted in the gear box 28 so as to extend parallel to the shaft 32 but at a distance therefrom. The left-hand end of the shaft 37 (in FIG. 8 of the drawings) is splined and intended to be placed in driven communication with the power takeoff shaft of a tractor or other supporting and propelling vehicle with the aid of an intermediate transmission shaft having universal joints at its opposite ends. The shaft 37 thus affords a power input shaft for the implement and is equivalent to the shaft 14A which can be seen in FIG. 1 of the drawings. The shaft 37 is rotatably supported, near its projecting splined end, by a ball bearing 38 located in a wall of the gear box 28 between a shoulder of that wall and a shoulder 39 in the shaft 37. An oil seal 40 is provided in the wall of the gear box 28 so as to surround the projecting end of the shaft 37. Towards its opposite end, the shaft 37 is rotatably mounted in a ball bearing 41 mounted in the same wall of the gear box as the double ball bearing 36 with the side thereof which faces the bearing 38 abutting against a shoulder of said wall and against a split ring or collar 42 carried by the shaft 37.

The bearings 36 and 41 are maintained in position in recesses of one of the walls of the gear box 28 by a retaining plate 43 formed with apertures through which the shafts 32 and 37 project, said apertures incorporating oil seals 45. The plate 43 is fastened to the wall of the gear box 28 in which the bearings 36 and 41 are located by a number of bolts 44. The ends of the two shafts 32 and 37 which project from the apertures in the retaining plate 43 are both splined, each of said ends being adapted to cooperate with one or other of a corresponding pair of spur pinions. The spur pinions of the two pairs also mesh with one another.

In the embodiment which is illustrated in FIG. 8 of the drawings, there is a pair of spur pinions 46 and 47 and a further pair of spur pinions 48 and 49, all four pinions being arranged in a housing 50 so as to form a single unit. There are two axes of rotation corresponding to the longitudinal axes of the shafts 32 and 37 and two of the spur pinions, one from each of the two pairs mentioned above, have one of said axes of rotation in common. All four spur pinions 46 to 49 have a different number of teeth, the pinions of one pair having 44 and 39 teeth respectively while those of the other pair have 42 and 41 teeth respectively. The housing 50 is of elongated approximately oblong shape, projections 51, 52 and 53 being formed on the internal surfaces of the walls of the housing to maintain the spur pinions 46 to 49 in their correct positions.

The end of the pinions 46, 48 and the pinions 47, 49 that are relatively remote from one another are formed with shoulders 54 which project into openings in the walls of the housing 50, said openings being provided with oil seals 55. The side of each pinion which faces a similar side of one of the other pinions is formed with a central circular recess 56 in which a dished oil plug 57 is located, to minimize the tendency to leakage of oil. The wall of the housing 50 which, in the position of the housing illustrated in FIG. 8 of the drawings, is furthest from the retaining plate 43 is secured to the remainder of the housing by bolts 58.

In the position of the housing 50 which is illustrated in FIG. 8 of the drawings, the splined ends of the shafts 32 and 37 are entered in the corresponding splines of the meshing pair of spur pinions 46 and 47. The other spur pinions 48 and 49 lie beyond the ends of the shafts 32 and 37 and, therefore, do not rotate with those shafts. The wall of the housing 50 which abuts against the retaining plate 43 is formed with ridges 59 which fit around projections 60 formed on said plate 43 in such a way as to correctly position the housing 50 relative to the two shafts 32 and 37. The housing 50 is releasably clamped in position relative to the gear box 28 by a pivotable yoke 61 which is turnable about aligned pivots 62 projecting from opposite sides of the gear box 28. The yoke 61 has two limbs 63 and an interconnecting crossbar 64 at the center of which latter a manually operable clamping screw 65 is mounted. The tip of the clamping screw 65 cooperates with one side of a pressure plate 66 the opposite side of which has both central and peripheral rims 67 that abut against the wall of the housing 50 furthest remote from the retaining plate 43. The yoke 61 and the parts associated therewith afford a quickly releasable mechanism for fixing the housing 50 to the gear box 28. It will be apparent from FIG. 8 of the drawings that the wall of the housing 50 which is engaged by the pressure plate 66 is formed with ridges 59 of similar construction and arrangement to the ridges 59 located on the relatively opposite wall of the same housing. Thus, either set of ridges 59 can cooperate with the projections 60 on the retaining plate 43. Circular plugs 68 close the apertures in the wall of the housing 50 that is furthest from the gear box 28 to prevent leakage of oil and the ingress of dirt and the like.

In the use of the cultivating implement which is shown diagrammatically in FIG. 7 of the drawings, the implement is connected to the three-point lifting device for an agricultural tractor or other supporting and propelling vehicle and the left-hand projecting end (in FIG. 8 of the drawings) of the shaft 37 is placed in driven connection with the power takeoff shaft of the same tractor or other vehicle with the aid of an intermediate transmission shaft having universal joints at its opposite ends. As previously mentioned, the shaft 37 drives the shaft 32 by way of the pair of spur pinions 46 and 47 and the shaft 32 drives the relatively perpendicular shaft 27 by way of the bevel pinions 30 and 31. As previously described, the shaft 27 transmits drive to the soil-working rotor 25. If it is desired that the speed of rotation of the rotor 35 should be changed without changing the speed of rotation of the input shaft 37, it is obviously necessary to alter the transmission ratio between these two shafts. This is done by loosening the clamping screw 65, turning the yoke 61 to one side about the pivots 62, removing the pressure plate 66 and withdrawing the housing 50 axially of the two shafts 32 and 37. The housing 50 can be replaced in any one of three different ways each of which will give a different transmission ratio. Firstly, the same side as before of the housing 50 can be presented to the retaining plate 43 but so that the pinion 46 cooperates with the shaft 37 and the pinion 47 with the shaft 32 instead of conversely as shown in FIG. 8. The second and third transmission ratios are obtained by removing the circular plugs 68 and presenting the side of the housing 50 at which said plugs were located to the retaining plate 43 so that the pinion 49 cooperates with the shaft 37 and the pinion 48 with the shaft 32 or vice versa. Whichever of the second and third arrangements is effected, the circular plugs 68 are replaced in the apertures of the wall of the housing 50 that, in FIG. 8 of the drawings, is closest to the retaining plate 43. After placing the housing 50 in its new position, the pressure plate 66 is replaced and the yoke 61 swung back to its operative setting as shown in FIG. 8 of the drawings, the clamping screw 65 being tightened to releasably fix the housing 50 in position. The arrangement which has been described enables four different speeds of rotation of the rotor 25 to be obtained without difficulty for a single speed of rotation of the input shaft 37. In the example which is being described, these speeds are 108, 137, 154 and 193 revolutions per minute respectively. It is preferred that the various shafts and spur and bevel pinions of the housing 50 and gear box 28 should be capable of transmitting at least 30 horsepower.

It will be apparent that, instead of employing gear wheels, other rotary transmission members such as sprockets or pulleys interconnected by chains or belts, ropes or the like may be employed. If four different possible speeds of rotation are not sufficient in any particular case, one or more additional housings 50 containing spur pinions or other transmission members adapted to give other transmission ratios may be provided as spare parts for the implement so that, when one of the additional possibilities is required, the spare housing which will give the required transmission ratio can be quickly substituted for the housing 50 which is in use. The arrangement which has been described enables assemblies of transmission gear wheels to be interchanged simply and rapidly without the need for the gear wheels of such assemblies to be handled individually. Since the gear wheels are contained in closed housings, they can be permanently lubricated without difficulty and without much danger of the lubricant becoming contaminated by dirt.

We claim:

1. A cultivating implement comprising a frame movable over the ground, a shaft rotatably mounted in said frame, said shaft having at least one soil-working member mounted thereon, means on said implement and connected with said shaft to rotate same counter to the direction of travel of the implement, and baffle means connected to said frame to extend above said shaft to guide displaced soil above said soil-working member towards the rear, said baffle means being comprised of at least two portions joined to one another to include a forward portion, at least a part of which is vibratory, and a rear perforated portion relative to the direction of travel, said forward portion being attached to said frame in front of the path of said soil-working member and the rear portion of said baffle means extending substantially free to the rear, at least part of said rear portion being located above and forwardly of said shaft relative to the direction of travel whereby soil displaced by the soil-working members initially strikes said vibratory portion and is thereafter moved into contact with said perforated rear portion.

2. An implement as claimed in claim 1, wherein said forward portion of the baffle is a resiliently mounted plate, said plate being biased by spring means.

3. An implement as claimed in claim 2, wherein said plate has a curved configuration and the center of curvature thereof substantially coincides with the longitudinal axis of said shaft.

4. An implement as claimed in claim 2, wherein the minimum distance between said plate and said soil-working member is less than 4 centimeters.

5. An implement as claimed in claim 2, wherein at least one edge of said plate is supported by guides and resilient means.

6. An implement as claimed in claim 5, wherein two opposite edges of said plate are supported by guides and resilient means.

7. A cultivating implement comprising a frame movable over the ground, a shaft rotatably mounted in said frame, said shaft having at least one soil-working member mounted thereon, means on said implement and connected with said shaft to rotate same counter to the direction of travel of the implement, and baffle means connected to said frame to extend above said shaft, said baffle means being positioned to guide displaced soil above said soil-working member towards the rear, said baffle means being comprised of at least two portions joined to one another to include a forward portion, at least a part of which is vibratory, and a rear perforated portion relative to the direction of travel, said forward portion comprising a solid plate member and being attached to said frame in front of the path of said soil-working member and the rear portion of said baffle means being formed of a plurality of rod members that extend substantially free to the rear, at least part of said rear portion being located above and forwardly of said shaft relative to the direction of travel whereby soil displaced by the soil-working members initially strikes said vibratory portion and is thereafter moved into contact with said perforated rear portion.